Patented Aug. 18, 1931

1,819,893

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

HEAT INSULATION MATERIAL AND COMPOSITION

No Drawing.    Application filed April 18, 1929.    Serial No. 356,297.

This invention relates to heat insulation materials and the manufacturing process thereof. It comprises new and useful materials and compositions of such materials.

Heat insulation materials, because of their relatively low conductivity of heat, are used to retard transmission of heat energy by conduction or radiation either to or from a particular body. The use of insulation to protect boilers, steam piping, etc., is well known. No substance is perfectly efficient in its action as a heat insulating material, as all substances conduct heat to a certain extent. Certain materials are, however, more efficient than others. Also the efficiency of a particular material varies with the temperature at which it is used. Normally, of course, the greater the efficiency of an insulating material, that is the lower its thermal conductivity, the more desirable it is for that purpose. An efficient insulating material which is widely used is magnesium carbonate, especially as combined with asbestos fiber in molded insulations commonly known as 85% magnesia. Diatomaceous earth is also used for heat insulation.

An important factor influencing the desirability of a heat insulating material is its stability under particular temperatures and conditions of use. For example, 85% magnesia, while highly desirable for use as a heat insulation material below 550° F., tends to decompose to a considerable extent at higher temperatures with resultant shrinkage and loss of mechanical strength. Another important factor in the desirability of heat insulation material, is the cost and availability of materials used in its composition. Diatomaceous earth, for example, exists only in certain natural deposits, varying in their quality, bulkiness, insulating efficiency, particle size, porosity and in the character and amount of impurities associated with the silicious diatoms. The available deposits of high quality diatomaceous earth are located at long distances from the principal markets for heat insulation products and therefore involve high freight costs. Other factors influencing the desirability of heat insulating materials are the ability of the material to be molded and shaped and the ability of the material, when molded, to retain its shape and form, an inherent quality due to the physical structure, strength, and binding properties of the materials used. Diatomaceous earth, for example, is extremely brittle and undesirable for that reason.

It is my invention to use magnesium hydroxide that has been precipitated from solution or magnesium hydroxide thus precipitated intimately mixed with alkaline earth carbonate in the composition of heat insulation material. These materials are preferably employed together with other suitable materials, such as asbestos fiber, diatomaceous earth or magnesium carbonate. It is preferable according to my invention to use magnesium hydroxide that has been made by precipitation from basic magnesium carbonate solution and likewise alkaline earth carbonate precipitated from solution. I regard it as preferable to employ magnesium hydroxide precipitated from basic magnesium carbonate solution mixed with precipitated alkaline earth carbonate as the major proportion of heat insulation material composed according to my invention, and, of the alkaline earth carbonates, I prefer to employ calcium carbonate. Moreover, I prefer to employ magnesium hydroxide intimately mixed with alkaline earth carbonate as a result of simultaneous precipitation from solution and in about equal proportions by weight.

I have found that magnesium hydroxide precipitated from basic magnesium carbonate solution is a light, highly flocculated, bulky, very finely divided, plastic material and is an excellent heat insulation material. Moreover, simultaneously precipitated mixtures of magnesium hydroxide with alkaline earth carbonate, are efficient heat insulators especially as precipitated from basic magnesium carbonate solution in a finely divided state. Their efficiency is comparable with that of the best commercial high temperature heat insulating materials now on the market. Insulations manufactured from mixtures of magnesium hydroxide and calcium carbonate simultaneously precipitated from basic magnesium carbonate solution, for example, are particularly suited for the range from 550° F. to 1,200° F. Insulations made from these materials do not suffer serious depreciation of their mechanical properties when used at temperatures as high as 1,200° F. These materials possess excellent molding properties and magnesium hydroxide precipitated as aforesaid has excellent inherent binding properties which tend to make insulations containing it retain their shape and form. Magnesium hydroxide precipitated from basic magnesium carbonate solution is particularly well suited for use in heat insulation materials which are light and bulky and which are preferably not bonded together by substances which set by chemical reaction such as cement but are bonded together merely by making a semi-fluid mix of finely divided ingredients in water and molding the mix in porous molds under pressure to expel the water, the bonding of the materials being largely due to the cohesion between the particles and flocculates of magnesium hydroxide.

In my co-application for improved magnesia process and magnesium values recovery (Ser. No. 356,296, filing date April 18, 1929) I have described and disclosed a method for recovering magnesium hydroxide or magnesium hydroxide intimately mixed with a metallic carbonate by precipitation of said substances from basic magnesium carbonate solution such as tailings liquor produced in the manufacture of magnesia wherein the magnesia is precipitated from a solution of magnesium bicarbonate. As magnesia manufactured by this process is used extensively, the large amounts of tailings liquid produced (regarded prior to the invention of my improved process as no more than a waste liquor) affords a ready source of ingredients for heat insulating materials composed according to my invention. While my invention is not to be regarded as limited to this source of materials, mixtures such as magnesium hydroxide and calcium carbonate simultaneously precipitated from basic magnesium carbonate solution in approximately equal proportions, are readily obtainable in the manner indicated and are comparatively inexpensive. Mixtures of magnesium hydroxide and calicum carbonate which are thus intimately commingled due to the fact that they have been simultaneously precipitated from a solution of basic magnesium carbonate, I regard as aforesaid, as preferable for uses according to my invention in heat insulation materials.

Certain properties of other substances which influence their suitability for use as ingredients of heat insulating materials composed according to my invention, are as follows: Asbestos fiber, in addition to being a highly efficient heat insulating material and resistant to high temperatures, possesses remarkable binding properties. For example, it may be employed in amounts such as 5%–15% and adds very greatly to the strength of the insulation with which it is mixed. Diatomaceous earth, in addition to its being a moderately efficient heat insulating material and resistant to high temperatures, is porous and its presence in amounts as for example, 5%–35% aids greatly in the manufacture of molded insulations by facilitating drainage from the molds. Magnesium carbonate is extremely light and bulky and of high insulating efficiency. It may be added as desired, for example 5%–25%.

The following are illustrative of heat insulating materials composed according to my invention with magnesium hydroxide precipitated from basic magnesium carbonate solution and calcium carbonate preferably also precipitated from said solution.

Magnesium hydroxide, calcium carbonate, and asbestos fiber.

Magnesium hydroxide, calcium carbonate, asbestos fiber and magnesium carbonate.

Magnesium hydroxide, calcium carbonate, asbestos fiber and diatomaceous earth.

Magnesium hydroxide, calcium carbonate, asbestos fiber, diatomaceous earth and magnesium carbonate.

The following is a specific example of a heat insulation material composed according to my invention which employs the materials mentioned herein and which gives a satisfactory heat insulation product:

| | Per cent |
|---|---|
| Magnesium hydroxide ($Mg(OH)_2$) and calcium carbonate $CaCO_3$ (approximately equal proportion by weight) | 55 |
| Asbestos fiber | 15 |
| Diatomaceous earth | 30 |

As previously stated, I prefer to use an intimately commingled mixture of magnesium hydroxide and calcium carbonate simultaneously precipitated from basic magnesium carbonate solution in approximately equal proportions by weight as the major ingredient of heat insulating material composed, according to my invention, and prefer to use therewith substances such as asbestos fibre, magnesium carbonate or diatomaceous earth, or a mixture of said materials as a minor proportion of my compositions. I wish it to be understood, however, that my invention should not be considered as limited to insulations containing a major proportion of magnesium hydroxide and calcium carbonate mixture precipitated as aforesaid or containing mixtures of these substances in approximately equal proportion by weight.

The advantages of heat insulations composed according to my invention may be summarized as follows:

They are efficient heat insulators, especially at relatively high temperatures such as 550° F. to 1200° F.

They are mechanically strong and tough and retain their shape and form, as molded.

They are resistant at relatively high temperatures such as 550° F. to 1200° F. to decomposition, shrinkage and loss of mechanical strength.

Their major ingredients are cheap and readily available.

They possess excellent molding properties.

The above advantages of heat insulation composed according to my invention, make them of great practical value and usefulness.

Heat insulation materials composed according to my invention may be manufactured according to the usual methods. They may be used to particular advantage in the manufacture of molded insulation by mixing the materials with water and molding the mix. For example, molded heat insulation composed of magnesium hydroxide and calcium carbonate mixture simultaneously precipitated from basic magnesium carbonate solution, asbestos fiber and diatomaceous earth, may be manufactured by mixing the ingredients with water, molding the mix while wet, and removing the excess water from the molds under pressure. In the usual case the molding pressures used should preferably be somewhat less than 50 pounds per square inch as the use of greater pressure, tends to compact the materials too much, making them undesirably dense and greatly lessening their insulation efficiency, thus losing to large extent the advantages gained by using magnesium hydroxide precipitated from basic magnesium carbonate solution or mixtures of precipitated magnesium hydroxide and precipitated metallic carbonates. Insulations thus made are light and bulky and normally weigh less than 30 pounds per cubic foot. It is preferable in composing insulations according to this invention that the resultant product should weigh less than 30 pounds per cubic foot.

While I have mentioned specifically certain preferred substances and compositions for heat insulating materials composed according to my invention, I have endeavored to set forth and desire it to be understood that my invention pertains generally to heat insulating materials which employ in their composition magnesium hydroxide precipitated from basic magnesium carbonate solution or a mixture of magnesium hydroxide and an alkaline earth carbonate intimately commingled as a result of simultaneous precipitation from solution.

I claim:

1. Heat insulation material employing in its composition magnesium hydroxide precipited from basic magnesium carbonate solution.

2. Heat insulation material employing in its composition magnesium hydroxide precipitated from basic magnesium carbonate solution and alkaline earth carbonate.

3. Heat insulation material employing in its composition magnesium hydroxide precipitated from basic magnesium carbonate solution and precipitated alkaline earth carbonate.

4. Heat insulation material employing in its composition a mixture of magnesium hydroxide and calcium carbonate intimately commingled as the result of simultaneous precipitation from a solution of basic magnesium carbonate.

5. Heat insulation material employing in its composition magnesium hydroxide precipitated from basic magnesium carbonate solution, alkaline earth carbonate, and asbestos fiber.

6. Heat insulation material employing in its composition magnesium hydroxide precipitated from basic magnesium carbonate solution, alkaline earth carbonate, and diatomaceous earth.

7. Heat insulation material employing in its composition magnesium hydroxide precipitated from basic magnesium carbonate solution, alkaline earth carbonate, and magnesium carbonate.

8. Heat insulation material employing in its composition magnesium hydroxide precipitated from basic magnesium carbonate solution, alkaline earth carbonate, asbestos fibre, diatomaceous earth, and magnesium carbonate.

9. Heat insulation material, a major proportion of which consists of a mixture of magnesium hydroxide precipitated from basic magnesium carbonate solution and precipitated alkaline earth carbonate.

10. Heat insulation material, a major proportion of which consists of a mixture of magnesium hydroxide precipitated from basic magnesium carbonate solution and precipitated alkaline earth carbonate in approximately equal proportions by weight.

11. Heat insulation material employing in its composition 20% or more of magnesium hydroxide precipitated from basic magnesium carbonate solution.

12. Heat insulation material, a major proportion of which consists of a mixture of magnesium hydroxide precipitated from basic magnesium carbonate solution and precipitated alkaline earth carbonate, and a minor proportion of which contains asbestos fiber.

13. Heat insulation material, a major proportion of which consists of a mixture of magnesium hydroxide precipitated from basic magnesium carbonate solution and precipitated calcium carbonate, and a minor proportion of which contains asbestos fiber, diatomaceous earth, and magnesium carbonate.

14. Heat insulation material composed substantially of the following ingredients:

| | Per cent |
|---|---|
| Magnesium hydroxide $Mg(OH)_2$ precipitated from basic magnesium carbonate solution and precipitated calcium carbonate $CaCO_3$ (approximately equal proportion by weight) | 55 |
| Asbestos fiber | 15 |
| Diatomaceous earth | 30 |

15. Heat insulation material employing in its composition more than 50% of a mixture of simultaneously precipitated magnesium hydroxide and precipitated calcium carbonate in approximately equal proportions by weight, admixed with asbestos fiber substantially in proportion 5% to 15%.

16. Heat insulation material employing in its composition more than 50% of a mixture of simultaneously precipitated magnesium hydroxide and precipitated calcium carbonate in approximately equal proportions by weight, admixed with magnesium carbonate substantially in proportion 5% to 25%.

17. Heat insulation material employing in its composition more than 50% of a mixture of simultaneously precipitated magnesium hydroxide and precipitated calcium carbonate in approximately equal proportions by weight, admixed with diatomaceous earth substantially in proportion 5% to 35%.

18. Heat insulation material employing in its composition a mixture of magnesium hydroxide and alkaline earth carbonate intimately commingled as the result of simultaneous precipitation from solution.

In testimony whereof, I have signed my name to this specification.

HAROLD W. GREIDER.